US011664855B2

(12) United States Patent
Gopal et al.

(10) Patent No.: US 11,664,855 B2
(45) Date of Patent: May 30, 2023

(54) TECHNIQUES FOR PERFORMING AN ANTENNA-SWITCHING DIVERSITY PROCEDURE

(71) Applicant: QUALCOMM Incorporated, San Diego, CA (US)

(72) Inventors: Thawatt Gopal, San Diego, CA (US); Touseef Khan, San Diego, CA (US); Qi Huang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 65 days.

(21) Appl. No.: 17/448,114

(22) Filed: Sep. 20, 2021

(65) Prior Publication Data

US 2022/0094395 A1    Mar. 24, 2022

Related U.S. Application Data

(60) Provisional application No. 62/706,981, filed on Sep. 22, 2020.

(51) Int. Cl.
*H04B 7/04* (2017.01)
(52) U.S. Cl.
CPC ..................... *H04B 7/04* (2013.01)
(58) Field of Classification Search
CPC ...... H04B 7/04; H04B 7/0602; H04B 7/0805; H04B 7/0404
See application file for complete search history.

(56) References Cited

U.S. PATENT DOCUMENTS

| 2003/0032403 | A1* | 2/2003 | Ono | H04B 7/0814 |
| | | | | 455/135 |
| 2013/0308554 | A1 | 11/2013 | Ngai et al. | |
| 2015/0094003 | A1* | 4/2015 | Ramkumar | H04B 7/0604 |
| | | | | 455/101 |
| 2017/0201289 | A1* | 7/2017 | Zhang | H04W 72/085 |
| 2019/0181942 | A1 | 6/2019 | Tang et al. | |

FOREIGN PATENT DOCUMENTS

CN          107613103 A          1/2018

OTHER PUBLICATIONS

International Search Report and Written Opinion—PCT/US2021/071525—ISA/EPO—dated Jan. 4, 2022.

* cited by examiner

*Primary Examiner* — Sung S Ahn
(74) *Attorney, Agent, or Firm* — Dalei Dong; Harrity & Harrity, LLP

(57)    ABSTRACT

Various aspects of the present disclosure generally relate to wireless communication. In some aspects, a user equipment (UE) may identify a first timer associated with a first antenna and a second timer associated with a second antenna. The UE may identify an expiration of the first timer associated with the first antenna. The UE may determine, based at least in part on the identified expiration of the first timer, whether a remaining time of the second timer associated with the second antenna is less than a timer threshold. The UE may select, based at least in part on the determination that the remaining time of the second timer is less than the timer threshold, the second antenna. Numerous other aspects are provided.

30 Claims, 7 Drawing Sheets

TECHNIQUES FOR PERFORMING AN ANTENNA-SWITCHING DIVERSITY PROCEDURE

CROSS-REFERENCE TO RELATED APPLICATION

This patent application claims priority to U.S. Provisional Patent Application No. 62/706,981, filed on Sep. 22, 2020, entitled "TECHNIQUES FOR PERFORMING AN ANTENNA-SWITCHING DIVERSITY PROCEDURE," and assigned to the assignee hereof. The disclosure of the prior application is considered part of and is incorporated by reference into this patent application.

FIELD OF THE DISCLOSURE

Aspects of the present disclosure generally relate to wireless communication and to techniques and apparatuses for performing an antenna-switching diversity procedure.

DESCRIPTION OF RELATED ART

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include a number of base stations (BSs) that can support communication for a number of user equipment (UEs). A UE may communicate with a BS via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, or the like.

The above multiple access technologies have been adopted in various telecommunication standards to provide a common protocol that enables different user equipment to communicate on a municipal, national, regional, and even global level. NR, which may also be referred to as 5G, is a set of enhancements to the LTE mobile standard promulgated by the 3GPP. NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some aspects, a method of wireless communication performed by a user equipment (UE) includes identifying a first timer associated with a first antenna and a second timer associated with a second antenna; identifying an expiration of the first timer associated with the first antenna; determining, based at least in part on the identified expiration of the first timer, whether a remaining time of the second timer associated with the second antenna is less than a timer threshold; and selecting, based at least in part on the determination that the remaining time of the second timer is less than the timer threshold, the second antenna.

In some aspects, the first timer is identified based at least in part on a first measurement associated with the first antenna satisfying a first criterion with respect to a measurement associated with an active antenna, and the second timer is identified based at least in part on a second measurement associated with the second antenna satisfying a second criterion with respect to the first measurement associated with the first antenna.

In some aspects, the method includes identifying a third timer for a third antenna based at least in part on a third measurement associated with the third antenna satisfying a third criterion with respect to the second measurement associated with the second antenna, wherein the third timer expires after an end of the timer threshold.

In some aspects, the method includes performing a transmission via the second antenna after selecting the second antenna.

In some aspects, the timer threshold is adjustable.

In some aspects, a duration associated with the timer threshold begins at the expiration of the first timer.

In some aspects, a UE for wireless communication includes a memory; and one or more processors coupled to the memory, the one or more processors configured to: identify a first timer associated with a first antenna and a second timer associated with a second antenna; identify an expiration of the first timer associated with the first antenna; determine, based at least in part on the identified expiration of the first timer, whether a remaining time of the second timer associated with the second antenna is less than a timer threshold; and select, based at least in part on the determination that the remaining time of the second timer is less than the timer threshold, the second antenna.

In some aspects, the first timer is identified based at least in part on a first measurement associated with the first antenna satisfying a first criterion with respect to a measurement associated with an active antenna, and the second timer is identified based at least in part on a second measurement associated with the second antenna satisfying a second criterion with respect to the first measurement associated with the first antenna.

In some aspects, the one or more processors are further configured to: identify a third timer for a third antenna based at least in part on a third measurement associated with the third antenna satisfying a third criterion with respect to the second measurement associated with the second antenna, wherein the third timer expires after an end of the timer threshold.

In some aspects, the one or more processors are further configured to: perform a transmission via the second antenna after selecting the second antenna.

In some aspects, the timer threshold is adjustable.

In some aspects, a duration associated with the timer threshold begins at the expiration of the first timer.

In some aspects, a non-transitory computer-readable medium storing a set of instructions for wireless communication includes one or more instructions that, when executed by one or more processors of a UE, cause the UE to: identify a first timer associated with a first antenna and a second timer associated with a second antenna; identify an expiration of the first timer associated with the first antenna; determine, based at least in part on the identified expiration of the first timer, whether a remaining time of the second timer associated with the second antenna is less than a timer threshold; and select, based at least in part on the determination that the remaining time of the second timer is less than the timer threshold, the second antenna.

In some aspects, the first timer is identified based at least in part on a first measurement associated with the first antenna satisfying a first criterion with respect to a measurement associated with an active antenna, and the second timer is identified based at least in part on a second measurement associated with the second antenna satisfying a second criterion with respect to the first measurement associated with the first antenna.

In some aspects, the one or more instructions further cause the UE to: identify a third timer for a third antenna based at least in part on a third measurement associated with the third antenna satisfying a third criterion with respect to the second measurement associated with the second antenna, wherein the third timer expires after an end of the timer threshold.

In some aspects, the one or more instructions further cause the UE to: perform a transmission via the second antenna after selecting the second antenna.

In some aspects, the timer threshold is adjustable.

In some aspects, a duration associated with the timer threshold begins at the expiration of the first timer.

In some aspects, an apparatus for wireless communication includes means for identifying a first timer associated with a first antenna and a second timer associated with a second antenna; means for identifying an expiration of the first timer associated with the first antenna; means for determining, based at least in part on the identified expiration of the first timer, whether a remaining time of the second timer associated with the second antenna is less than a timer threshold; and means for selecting, based at least in part on the determination that the remaining time of the second timer is less than the timer threshold, the second antenna.

In some aspects, the first timer is identified based at least in part on a first measurement associated with the first antenna satisfying a first criterion with respect to a measurement associated with an active antenna, and the second timer is identified based at least in part on a second measurement associated with the second antenna satisfying a second criterion with respect to the first measurement associated with the first antenna.

In some aspects, the apparatus includes means for identifying a third timer for a third antenna based at least in part on a third measurement associated with the third antenna satisfying a third criterion with respect to the second measurement associated with the second antenna, wherein the third timer expires after an end of the timer threshold.

In some aspects, the apparatus includes means for performing a transmission via the second antenna after selecting the second antenna.

In some aspects, the timer threshold is adjustable.

In some aspects, a duration associated with the timer threshold begins at the expiration of the first timer.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with a 5G or NR radio access technology (RAT), aspects of the present disclosure can be applied to other RATs, such as a 3G RAT, a 4G RAT, and/or a RAT subsequent to 5G (e.g., 6G).

Figure 1:
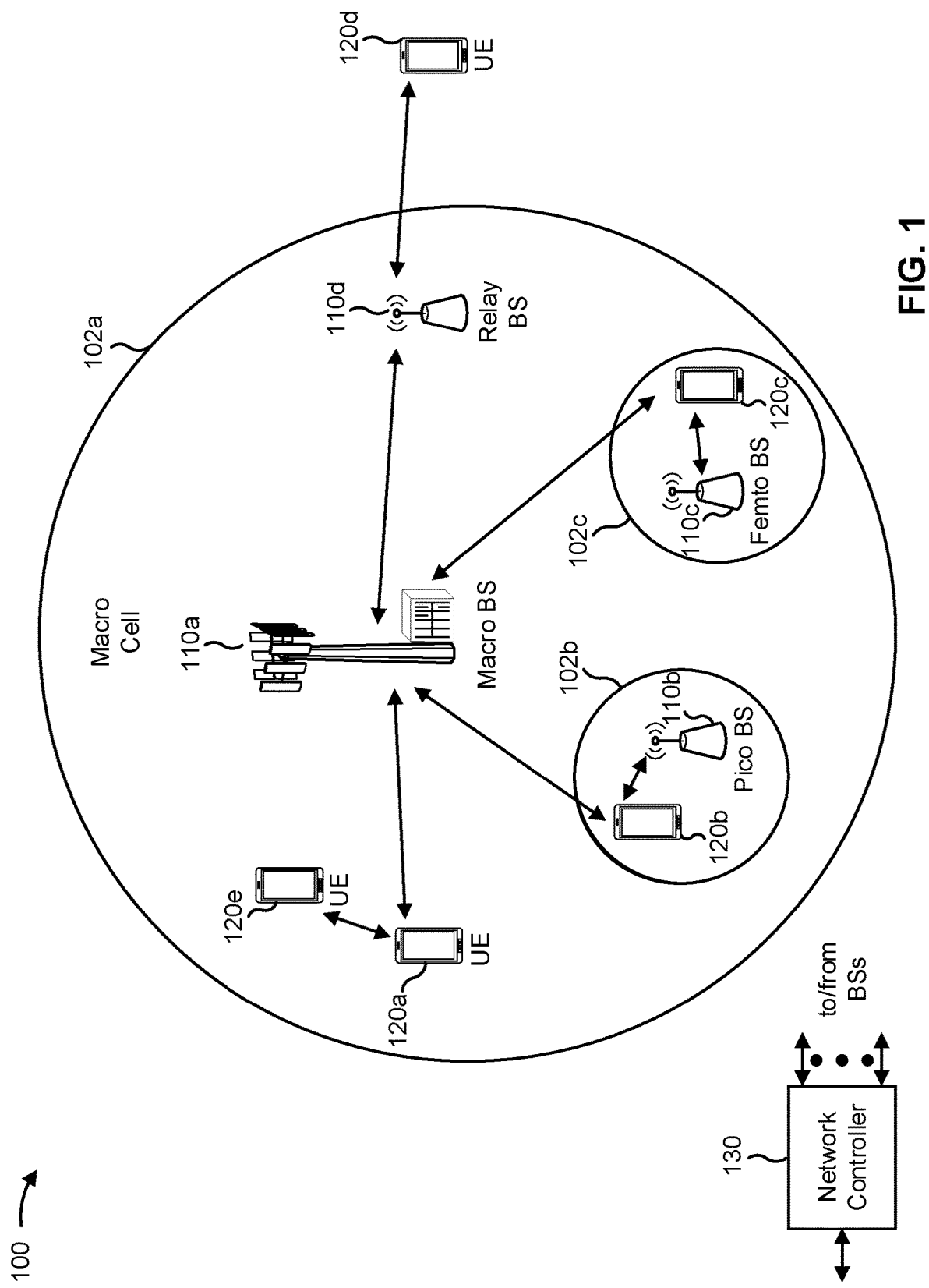
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (NR) network and/or an LTE network, among other examples. The wireless network 100 may include a number of base stations 110 (shown as BS 110a, BS 110b, BS 110c, and BS 110d) and other network entities. A base station (BS) is an entity that communicates with user equipment (UEs) and may also be referred to as an NR BS, a Node B, a gNB, a 5G node B (NB), an access point, a transmit receive point (TRP), or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces, such as a direct physical connection or a virtual network, using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay BS 110d may communicate with macro BS 110a and a UE 120d in order to facilitate communication between BS 110a and UE 120d. A relay BS may also be referred to as a relay station, a relay base station, a relay, or the like.

Wireless network 100 may be a heterogeneous network that includes BSs of different types, such as macro BSs, pico BSs, femto BSs, relay BSs, or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, and/or location tags, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components and/or memory components. In some aspects, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks may be deployed in a given geographic area. Each wireless network may support a particular RAT and may operate on one or more frequencies. A RAT may also be referred to as a radio technology, an air interface, or the like. A frequency may also be referred to as a carrier, a frequency channel, or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol or a vehicle-to-infrastructure (V2I) protocol), and/or a mesh network. In this case, the UE 120 may perform scheduling operations, resource selection operations, and/or other operations described elsewhere herein as being performed by the base station 110.

Devices of wireless network 100 may communicate using the electromagnetic spectrum, which may be subdivided based on frequency or wavelength into various classes, bands, channels, or the like. For example, devices of wireless network 100 may communicate using an operating band having a first frequency range (FR1), which may span from 410 MHz to 7.125 GHz, and/or may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHz, FR1 is often referred to as a "sub-6 GHz" band. Similarly, FR2 is often referred to as a "millimeter wave" band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" or the like, if used herein, may broadly represent frequencies less than 6 GHz, frequencies within FR1, and/or mid-band frequencies (e.g., greater than 7.125 GHz). Similarly, unless specifically stated otherwise, it should be understood that the term "millimeter wave" or the like, if used herein, may broadly represent frequencies within the EHF band, frequencies within FR2, and/or mid-band frequencies (e.g., less than 24.25 GHz). It is contemplated that the frequencies included in FR1 and FR2 may be modified, and techniques described herein are applicable to those modified frequency ranges.

As indicated above, FIG. 1 is provided as an example. Other examples may differ from what is described with regard to FIG. 1.

Figure 2:
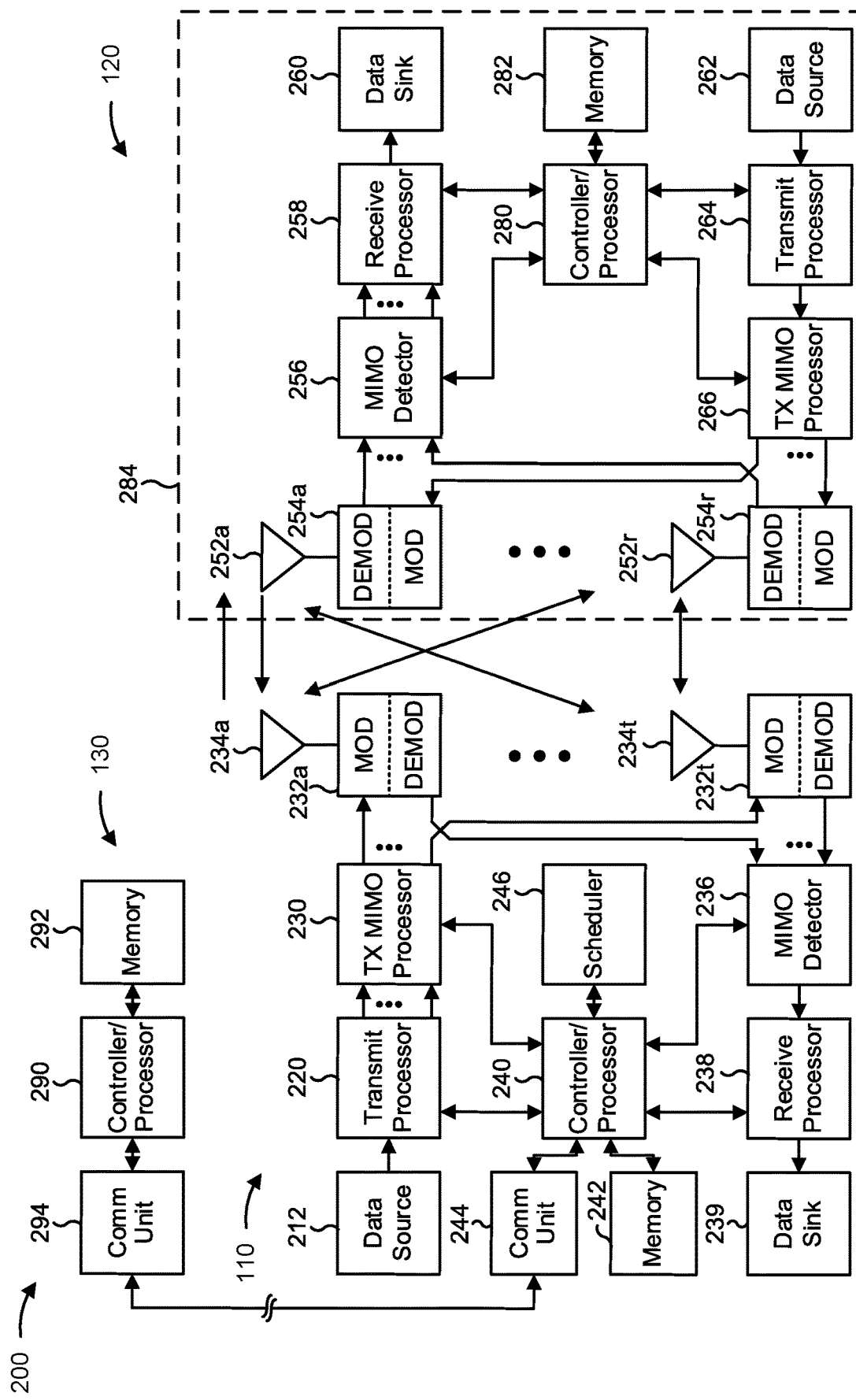
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI)) and control information (e.g., CQI requests, grants, and/or upper layer signaling) and provide overhead symbols and control symbols. Transmit processor 220 may also generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some aspects, one or more components of UE 120 may be included in a housing 284.

Network controller 130 may include communication unit 294, controller/processor 290, and memory 292. Network controller 130 may include, for example, one or more devices in a core network. Network controller 130 may communicate with base station 110 via communication unit 294.

Antennas (e.g., antennas 234a through 234t and/or antennas 252a through 252r) may include, or may be included within, one or more antenna panels, antenna groups, sets of antenna elements, and/or antenna arrays, among other examples. An antenna panel, an antenna group, a set of antenna elements, and/or an antenna array may include one or more antenna elements. An antenna panel, an antenna group, a set of antenna elements, and/or an antenna array may include a set of coplanar antenna elements and/or a set of non-coplanar antenna elements. An antenna panel, an antenna group, a set of antenna elements, and/or an antenna array may include antenna elements within a single housing and/or antenna elements within multiple housings. An antenna panel, an antenna group, a set of antenna elements, and/or an antenna array may include one or more antenna elements coupled to one or more transmission and/or reception components, such as one or more components of FIG. 2.

On the uplink, at UE 120, a transmit processor 264 may receive and process data from a data source 262 and control information (e.g., for reports that include RSRP, RSSI, RSRQ, and/or CQI) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM or CP-OFDM), and transmitted to base station 110. In some aspects, a modulator and a demodulator (e.g., MOD/DEMOD 254) of the UE 120 may be included in a modem of the UE 120. In some aspects, the UE 120 includes a transceiver. The transceiver may include any combination of antenna(s) 252, modulators and/or demodulators 254, MIMO detector 256, receive processor 258, transmit processor 264, and/or TX MIMO processor 266. The transceiver may be used by a processor (e.g., controller/processor 280) and memory 282 to perform aspects of any of the methods described herein.

At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Base station 110 may include a scheduler 246 to schedule UEs 120 for downlink and/or uplink communications. In some aspects, a modulator and a demodulator (e.g., MOD/DEMOD 232) of the base station 110 may be included in a modem of the base station 110. In some aspects, the base station 110 includes a transceiver. The transceiver may include any combination of antenna(s) 234, modulators and/or demodulators 232, MIMO detector 236, receive processor 238, transmit processor 220, and/or TX MIMO processor 230. The transceiver may be used by a processor (e.g., controller/processor 240) and memory 242 to perform aspects of any of the methods described herein.

Controller/processor 240 of base station 110, controller/processor 280 of UE 120, and/or any other component(s) of FIG. 2 may perform one or more techniques associated with performing an antenna-switching diversity procedure, as described in more detail elsewhere herein. For example, controller/processor 240 of base station 110, controller/processor 280 of UE 120, and/or any other component(s) of FIG. 2 may perform or direct operations of, for example, process 500 of FIG. 5, and/or other processes as described herein. Memories 242 and 282 may store data and program codes for base station 110 and UE 120, respectively. In some aspects, memory 242 and/or memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 500 of FIG. 5, and/or other processes as described herein. In some aspects, executing instructions may include running the instructions, converting the instructions, compiling the instructions, and/or interpreting the instructions.

In some aspects, UE 120 includes means for identifying a first timer associated with a first antenna and a second timer associated with a second antenna; means for identifying an expiration of the first timer associated with the first antenna; means for determining, based at least in part on the identified expiration of the first timer, whether a remaining time of the second timer associated with the second antenna is less than a timer threshold; and means for selecting, based at least in part on the determination that the remaining time of the second timer is less than the timer threshold, the second antenna. The means for the UE 120 to perform operations described herein may include, for example, antenna 252, demodulator 254, MIMO detector 256, receive processor 258, transmit processor 264, TX MIMO processor 266, modulator 254, controller/processor 280, and/or memory 282.

In some aspects, the UE 120 includes means for identifying a third timer for a third antenna based at least in part on a third measurement associated with the third antenna satisfying a third criterion with respect to the second measurement associated with the second antenna, wherein the third timer expires after an end of the timer threshold.

In some aspects, the UE 120 includes means for performing a transmission via the second antenna after selecting the second antenna.

As indicated above, FIG. 2 is provided as an example. Other examples may differ from what is described with regard to FIG. 2.

A UE may conduct data communication with a BS or another wireless device (e.g., another UE) in a wireless network such as an LTE network or a 5G/NR network. To communicate data, the UE may include transmission circuitry and reception circuitry. The transmission circuitry may include, among other components, a plurality of transmission antennas to transmit data during the data communication.

The UE may use a diversity scheme, such as an antenna-switching diversity scheme, to enable a threshold quality associated with the data communication. An antenna-switching diversity scheme is a scheme for switching the active antenna (that is, the antenna used for a particular transmission or reception) based at least in part on conditions associated with the active antenna and/or other antennas. For instance, at a given time, the UE may use a first transmission antenna, from among the plurality of transmission antennas, to transmit a transmission. While transmitting the transmission, the first transmission antenna may experience, for example, antenna blockages (e.g., user hand and/or head obstructing a transmission and/or a reception path associated with an antenna), propagation shadowing effects (e.g., fluctuations in signal power based at least in part on antenna blockages), antenna imbalances, and/or specific absorption rate (SAR) limits (e.g., a regulatory limit to a utilized amount of transmission power). The effects of antenna blockages, propagation shadowing effects, antenna imbalances, and/or SAR limits may be collectively referred to as "antenna degradations." To mitigate these antenna degradations, the UE may switch to using a second transmission antenna, from among the plurality of transmission antennas, as an active antenna to transmit data based at least in part on an estimation that the second antenna may experience reduced antenna degradation with respect to the first transmission antenna. Additionally, or alternatively, the switching of the transmission antenna can be based at least in part on an antenna order, which specifies an order in which the UE switches from transmission antenna to transmission antenna.

As the environment around the UE varies, the second transmission antenna may experience more antenna degradation, such that a quality associated with the data communication deteriorates below the threshold quality associated with the antenna-switching diversity scheme. In this case, the UE may again switch to using another transmission antenna (e.g., the first transmission antenna, a third transmission antenna, or the like), from among the plurality of transmission antennas, to mitigate effects of the antenna degradation observed while using the second transmission antenna. Thus, an antenna-switching diversity scheme that provides the UE with a flexibility to switch among the plurality of transmission antennas may allow the UE to avoid effects of the antenna degradation and to provide the threshold quality associated with the data communication.

Switching among the plurality of transmission antennas may introduce interruptions in the data communication. For instance, switching from one transmission antenna to another transmission antenna may involve a rearrangement or reconfiguration of components including, for example, a cross-switch that is utilized to transfer transmission signals from a processor to a transmission antenna, and data communication may be suspended during the rearrangement or reconfiguration of the components. As a result, a throughput of the UE may be negatively impacted.

Various aspects of techniques and apparatuses described herein may enable a UE to reduce a number of interruptions in data communication by reducing a number of switching occurrences from one transmission antenna to another in association with an antenna-switching diversity scheme. For example, the UE may use a measured value, such as an RSRP across multiple antennas, to select a best transmission antenna.

In some aspects, the UE may perform the antenna-switching diversity procedure by identifying a first timer associated with a first antenna and a second timer associated with a second antenna, identifying an expiration of the first timer associated with the first antenna, determining, based at least in part on the identified expiration of the first timer, whether a remaining time of the second timer associated with the second antenna is less than a timer threshold, and selecting, based at least in part on the determination that the remaining time of the second timer is less than the timer threshold, the second antenna. In some aspects, the UE may perform the antenna-switching diversity procedure by starting a first hold timer for a first antenna, starting a second hold timer for a second antenna based at least in part on a measurement associated with the second antenna satisfying a threshold with respect to a measurement associated with the first antenna, wherein the second hold timer expires within a given duration of time after an expiration of the first hold timer, and switching to the second antenna based at least in part on the second hold timer expiring within the given duration of time.

In this way, by reducing the number of switching occurrences from one transmission antenna to another, the antenna-switching diversity procedure, described herein, may reduce the number of interruptions in the data communication and provide a threshold quality associated with the data communication. As a result, a throughput enabled by the UE may be improved. Additionally, the UE may avoid performing an amount of processing, associated with rearrangement of components to switch transmission antennas, that would have otherwise occurred using other antenna-switching diversity procedures.

Figure 3:
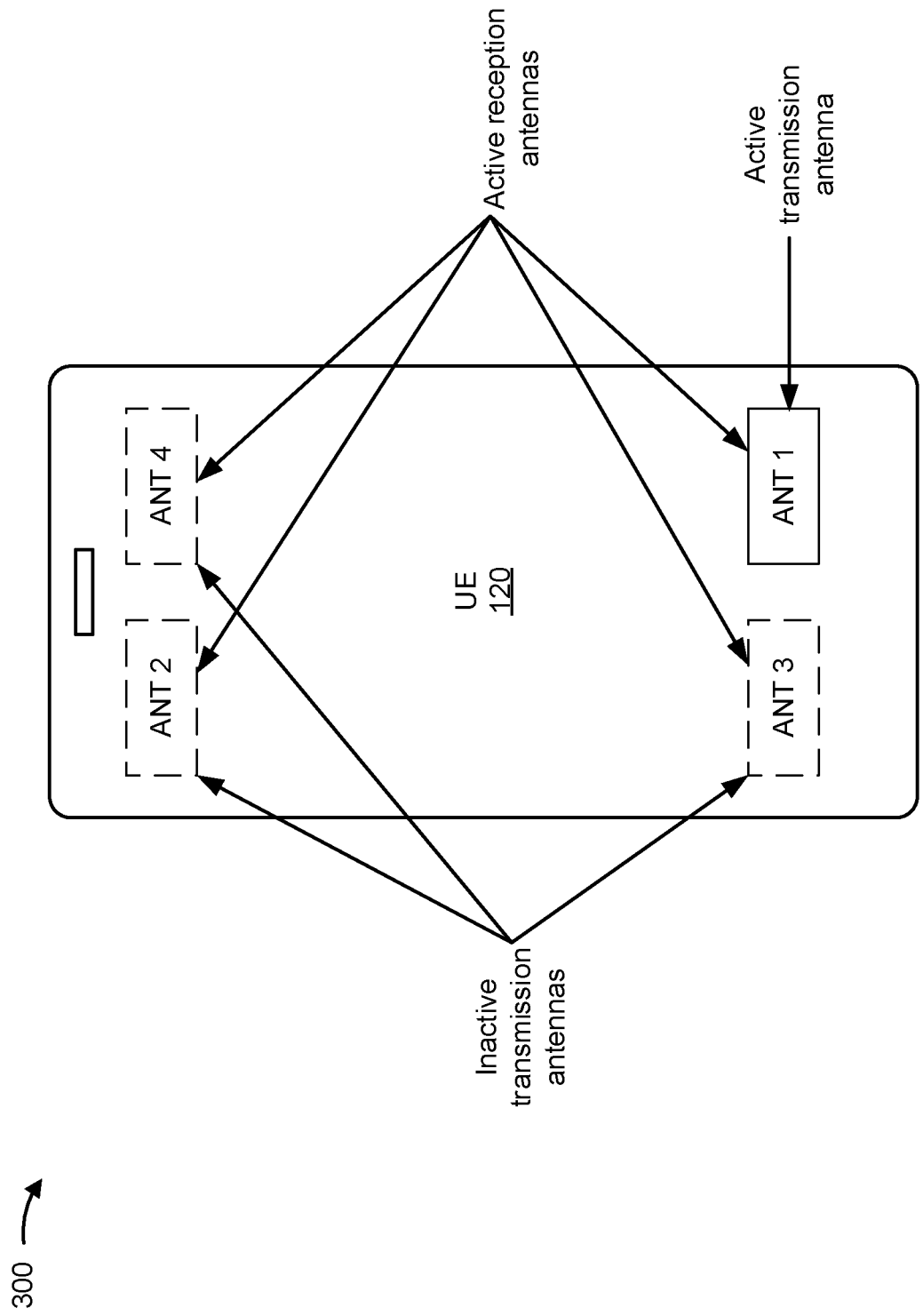
FIG. 3 is a diagram illustrating an example of a UE associated with performing an antenna-switching diversity procedure, in accordance with the present disclosure.

FIG. 3 is a diagram illustrating an example 300 of a UE associated with performing an antenna-switching diversity procedure, in accordance with the present disclosure. FIG. 3 shows a UE 120 capable of conducting data communication in a wireless network, such as an LTE network or a 5G/NR network. The UE 120 may conduct the data communication with a BS or another wireless device (e.g., another UE). The UE 120 may include one or more UEs discussed elsewhere herein, such as, for example, the UE discussed with respect to FIG. 2.

To conduct the data communication, the UE 120 may include transmission circuitry and reception circuitry. The transmission circuitry may include, among other components, a plurality of transmission antennas and the reception circuitry may include, among other components, a plurality of reception antennas. A transmission antenna is an antenna used for transmitting a signal. A reception antenna is an antenna used for receiving a signal. As shown in FIG. 3, the UE 120 may include, for example, four antennas: Ant 1, Ant 2, Ant 3, and Ant 4. In some aspects, an antenna may include a single antenna that is used for transmission and/or reception, such as associated with one or more of respective transmission circuitry or reception circuitry. In some aspects, Ant 1 may include a Tx ant 1 and an Rx ant 1, Ant 2 may include a Tx ant 2 and an Rx ant 2, Ant 3 may include a Tx ant 3 and an Rx ant 3, and/or Ant 4 may include a Tx ant 4 and an Rx ant 4. In some aspects, at a given time, the UE 120 may use a single transmission antenna to transmit data during the data communication. The in-use single transmission antenna may also be referred to as an active transmission antenna. For instance, as shown in FIG. 3, Tx ant 1, associated with Ant 1, may be the active transmission antenna and each of Tx ant 2, Tx ant 3, and Tx ant 4 may be an inactive transmission antenna. For simplicity, if an antenna includes a single antenna that is used as a transmit antenna and a receive antenna, the antenna is referred to as a transmission antenna when performing transmission and a reception antenna when performing reception. The transmission antennas and/or the reception antennas may include one or more antennas discussed elsewhere herein including, for example, antennas 252a through 252r discussed above with respect to FIG. 2. In some aspects, the UE 120 may use multiple transmission antennas to transmit data concurrently during the data communication.

In some aspects, a transmission antenna may be associated with a reception antenna such that the transmission antenna and the reception antenna form a transmission-reception antenna pair (Tx-Rx ant pair). For instance, Tx ant 1 and Rx ant 1 may form a Tx-Rx ant pair 1, Tx ant 2 and Rx ant 2 may form a Tx-Rx ant pair 2, Tx ant 3 and Rx ant 3 may form a Tx-Rx ant pair 3, and Tx ant 4 and Rx ant 4 may form a Tx-Rx ant pair 4.

In some aspects, a reception antenna may be configured to receive one or more reference signals that enable the UE 120 to estimate a condition associated with a performance of an associated transmission antenna. In some aspects, a reception antenna may be placed adjacent to the associated transmission antenna to configure the reception antenna to receive the one or more reference signals that enable the UE 120 to estimate a condition associated with a performance of the associated transmission antenna. For instance, as shown in FIG. 3, Rx ant 3 may be placed adjacent to Tx ant 3 to configure Rx ant 3 to receive reference signals that enable the UE 120 to estimate a condition associated with a performance of Tx ant 3. In some aspects, a reception antenna may receive reference signals, and may determine a measurement such as an RSRP associated with the associated transmission antenna. The determined measurement may enable the UE 120 to estimate, for example, an amount of antenna degradation associated with the transmission antenna. The measurement performed on the received reference signal may be useful to determine the antenna degradation associated with the transmission antenna because the reference signal and transmissions via the transmission antenna may generally be expected to encounter similar channel conditions (sometimes referred to as channel reciprocity). In some aspects, the measurement may include, for example, a signal-to-noise ratio (SNR), an RSSI, an amount of power headroom, an amount of power consumed per unit of time associated with using a transmission antenna, and/or the like.

In some aspects, each reception antenna may periodically receive the reference signals to enable the UE 120 to periodically estimate an amount of antenna degradation associated with each transmission antenna. Based at least in part on the estimated amount of antenna degradations associated with each transmission antenna, the UE 120 may perform an antenna-switching diversity procedure. In some aspects, as discussed in further detail with respect to FIGS. 4-7, the antenna-switching diversity procedure may include switching from using a given transmission antenna (also referred to as an active transmission antenna) to using another transmission antenna (also referred to as a candidate transmission antenna) when one or more antenna degradations observed while using the active transmission antenna may result in a quality associated with the data communication deteriorating below a threshold quality.

The number and arrangement of antennas shown in FIG. 3 are provided as an example. For instance, there may be additional antennas (e.g., five or more) or fewer antennas (e.g., two or three) than those shown in FIG. 3. In some aspects, the transmission and reception antennas may be arranged differently than shown in FIG. 3. Furthermore, a transmission antenna and a reception antenna shown in FIG. 3 may be implemented within a single component, or a single transmission antenna or a single reception antenna shown in FIG. 3 may be implemented as multiple, distributed components.

As indicated above, FIG. 3 is provided as an example. Other examples may differ from what is described with regard to FIG. 3.

Figure 4:
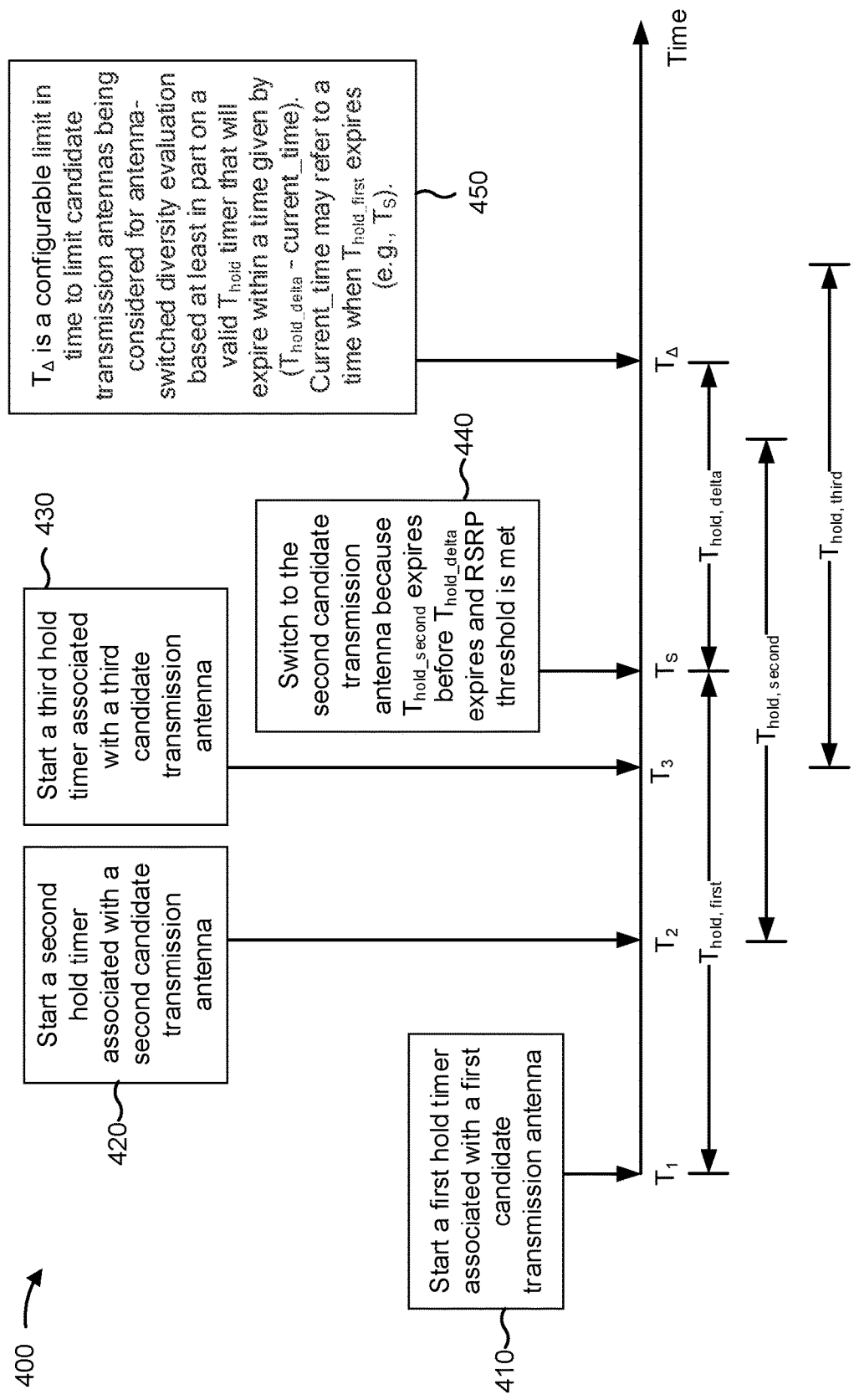
FIG. 4 is a timing diagram illustrating an example associated with performing an antenna-switching diversity procedure, in accordance with the present disclosure.

FIG. 4 is a diagram illustrating an example 400 associated with performing an antenna-switching diversity procedure, in accordance with the present disclosure. As shown in FIG. 4, events associated with the antenna-switching diversity procedure may be plotted along a timeline charted on a horizontal axis, which represents time. The antenna-switching diversity procedure may be performed by a UE 120 (not shown in FIG. 4) capable of conducting data communication. The UE 120 may include one or more UEs discussed elsewhere herein, such as, for example, the UE 120 discussed with respect to FIG. 2 and/or the UE 120 discussed with respect to FIG. 3.

The UE 120 may include a processor to perform the antenna-switching diversity procedure. The processor may include one or more processors discussed elsewhere herein, such as, for example, the processor components discussed above with respect to FIG. 2. The processor of the UE 120 may be coupled to transmission circuitry and reception circuitry included in the UE 120. The transmission circuitry may include a plurality of transmission antennas and the reception circuitry may include a plurality of reception antennas. The plurality of transmission antennas may include one or more antennas discussed elsewhere herein, such as, for example, transmission antennas Tx ant 1, Tx ant 2, Tx ant 3, and Tx ant 4 discussed above with respect to FIG. 3 and/or antennas 252a through 252r discussed above with respect to FIG. 2. Similarly, the plurality of reception antennas may include one or more antennas discussed elsewhere herein, such as, for example, reception antennas Rx ant 1, Rx ant 2, Rx ant 3, and Rx ant 4 discussed above with respect to FIG. 3 and/or antennas 252a through 252r discussed above with respect to FIG. 2.

The antenna-switching diversity procedure may include switching from using an active transmission antenna to using one or more of candidate transmission antennas when an amount of antenna degradation observed while using the active transmission antenna may result in, for example, a quality associated with the data communication deteriorating below a threshold quality. In some aspects, as discussed above with respect to FIG. 3, the UE 120 may periodically estimate the amount of antenna degradation associated with each transmission antenna. Based at least in part on the estimated amount of antenna degradation associated with each transmission antenna, the UE 120 may switch from using the active transmission antenna to using one of the candidate transmission antennas.

In some aspects, the UE 120 may initiate the antenna-switching diversity procedure based at least in part on determining that an amount of antenna degradation associated with the active transmission antenna may be higher than an amount of antenna degradation associated with a first candidate transmission antenna. For instance, the UE 120 may initiate the antenna-switching diversity procedure based at least in part on received reference signals indicating that an RSRP associated with the first candidate transmission antenna is greater than an RSRP associated with the active transmission antenna by at least a first threshold amount (which may be expressed as "RSRP_Threshold"). In some aspects, the first candidate transmission antenna may include one or more antennas. In one example, the first threshold amount may be 3 dBm. In some aspects, the first threshold amount may be adjustable by the UE 120.

To initiate the antenna-switching diversity procedure, as shown by reference number 410, the UE 120 may start, at time $T_1$, a first hold timer ($T_{hold, first}$) associated with the first candidate transmission antenna (e.g., Tx ant 1) based at least in part on determining that an RSRP (e.g., −70 dBm) associated with the first candidate transmission antenna (e.g., Tx ant 1) is greater than an RSRP (e.g., −80 dBm) associated with the active transmission antenna (e.g., Tx ant 4) by at least the first threshold amount. The first hold timer ($T_{hold, first}$) may while the RSRP (e.g., −70 dBm) associated with the first candidate transmission antenna (e.g., Tx ant 1) remains greater than the RSRP (e.g., −80 dBm) associated with the active transmission antenna (e.g., Tx ant 4) by at least the first threshold amount (e.g., 3 dBm). In some aspects, the first hold timer may be adjustable by the UE 120.

While the first hold timer ($T_{hold, first}$) is running, the UE 120 may determine that an RSRP associated with a second candidate transmission antenna (e.g., Tx ant 2) is greater than the RSRP associated with the first candidate transmission antenna (e.g., Tx ant 1) by at least a second threshold amount (e.g., 3 dBm). In some aspects, the second threshold amount may be the same as the first threshold amount. In some other aspects, the second threshold amount may be different with respect to the first threshold amount. For instance, the second threshold amount may be greater than the first threshold amount to ensure that a delay in switching to a candidate transmission antenna is implemented when obtaining an optimized increase in a quality associated with the data communication. In some aspects, the second threshold amount may be adjustable by the UE 120. In some aspects, the second candidate transmission antenna may include one or more antennas.

As shown by reference number 420, the UE 120 may start, at time $T_2$, a second hold timer ($T_{hold, second}$) associated with the second candidate transmission antenna (e.g., Tx ant 2) based at least in part on determining that the RSRP (e.g., −65 dBm) associated with the second candidate transmission antenna (e.g., Tx ant 2) is greater than the RSRP (e.g., −70 dBm) associated with the first candidate transmission antenna (e.g., Tx ant 1) by at least the second threshold amount. The second hold timer ($T_{hold, second}$) may run while the RSRP (e.g., −65 dBm) associated with the second candidate transmission antenna (e.g., Tx ant 2) remains greater than the RSRP (e.g., −70 dBm) associated with the first candidate transmission antenna (e.g., Tx ant 1) by at least the second threshold amount (e.g., 3 dBm). In some aspects, a length of the second hold timer may be adjustable by the UE 120. In some aspects, a length of the second hold timer may be the same as a length of the first hold timer.

In some examples, while the first hold timer ($T_{hold, first}$) is running, the UE 120 may determine that an RSRP associated with a third candidate transmission antenna (e.g., Tx ant 3) is greater than the RSRP associated with the second candidate transmission antenna (e.g., Tx ant 2) by at least a third threshold amount. In some aspects, the third threshold amount may be the same as the second threshold amount. In some other aspects, the third threshold amount may be different than the first threshold amount and/or the second threshold amount. For instance, the third threshold amount may be greater than the first threshold amount and/or the second threshold amount to ensure that a delay in switching to a candidate transmission antenna is implemented when obtaining an optimized increase in the quality associated with the data communication. In some aspects, the third threshold amount may be adjustable by the UE 120. In some aspects, the third candidate transmission antenna may include one or more antennas.

In some aspects, as shown by reference number 430, the UE 120 may start, at time $T_3$, a third hold timer ($T_{hold, third}$) associated with a third candidate transmission antenna (e.g., Tx ant 3) based at least in part on determining that the RSRP (e.g., −60 dBm) associated with the third candidate transmission antenna (e.g., Tx ant 3) is greater than the RSRP (−65 dBm) associated with the second candidate transmission antenna (e.g., Tx ant 2) by at least the third threshold amount. The third hold timer ($T_{hold, third}$) may run while the RSRP (e.g., −60 dBm) associated with the third candidate transmission antenna (e.g., Tx ant 3) remains greater than the RSRP (−65 dBm) associated with the second candidate transmission antenna (e.g., Tx ant 2) by at least the third threshold amount. In some aspects, a length of the third hold timer may be adjustable by the UE 120. In some aspects, a length of the third hold timer may be the same as a length of the first hold timer and/or a length of the second hold timer.

At reference number 440, the UE 120 may identify, at time $T_S$, a delta hold timer ($T_{hold, delta}$) associated with a given duration of time. In some aspects, the UE 120 may identify the delta hold timer ($T_{hold, delta}$) at substantially an end of the first hold timer ($T_{hold, first}$), such as at $T_S$. The delta hold timer ($T_{hold, delta}$) may expire at time $T_A$, as shown by reference number 450. The given duration of time may be configurable by the UE 120. In other words, the time $T_A$ may be a configurable limit in time. In some aspects, the time $T_A$ may limit consideration of candidate transmission antennas being considered for the antenna-switching diversity procedure based at least in part on a valid hold timer that expires before a difference between time $T_A$ and a time $T_S$. For example, the UE 120 may filter out an antenna (e.g., may not consider the antenna) as a candidate transmission antenna based at least in part on the antenna's hold timer expiring after $T_A$. The time $T_S$ may refer to a time when the first hold timer ($T_{hold, first}$) expires.

In some aspects, the given duration of time for the delta hold timer ($T_{hold, delta}$) may be preset (e.g., in an initial configuration of the UE 120, in initial connection or onboarding) and may be adjustable by the UE 120. For instance, the given duration of time may be set to a value sufficient for the UE 120 to determine whether the UE 120 should switch to the first candidate transmission antenna (e.g., Tx ant 1), to the second candidate transmission antenna (e.g., Tx ant 2), or to the third candidate transmission antenna (e.g., Tx ant 3). In some aspects, the given duration of time may be 640 ms. In some aspects, the given duration of time may be in units of milliseconds.

As shown, at time $T_S$, the UE 120 may switch to the second candidate transmission antenna based at least in part on the second hold timer ($T_{hold, second}$) expiring within the given duration of time of the delta hold timer (Thou, delta) and based at least in part on the RSRP associated with the second candidate transmission antenna (e.g., Tx ant 2) being greater than the RSRP associated with the first candidate transmission antenna (e.g., Tx ant 1) by the second threshold amount.

In some aspects, the UE 120 may avoid switching, at time $T_S$ and after $T_{hold,third}$ has expired, to the third candidate transmission antenna based at least in part on the third hold timer ($T_{hold, third}$) expiring after $T_A$. For example, the UE may determine not to switch to the third candidate transmission antenna based at least in part on the third hold timer expiring after the end of the given duration of time of the delta hold timer. In some aspects (not shown in FIG. 4), the UE 120 may switch to the first candidate transmission antenna (e.g., Tx ant 1) based at least in part on the second hold timer ($T_{hold, second}$) expiring after $T_A$ (e.g., the end of the given duration of time of the delta hold timer ($T_{hold, delta}$)) and based at least in part on the third hold timer (Thou, third) expiring after $T_A$ (e.g., the end of the given duration of time of the delta hold timer ($T_{hold, delta}$)). In some aspects, in a situation where both the second hold timer ($T_{hold, second}$) and the third hold timer ($T_{hold, third}$) expire within the given duration of time of the delta hold timer ($T_{hold, delta}$) (not shown in FIG. 4), the UE 120 may switch to the third candidate transmission antenna based at least in part on the RSRP associated with the third candidate transmission antenna being greater than the RSRP associated with the second candidate transmission antenna.

In some aspects, the UE 120 may determine the length of the first hold timer ($T_{hold, first}$) to be, for example, 1000 milliseconds, the length of the second hold timer ($T_{hold, second}$) to be, for example, 1000 milliseconds, the length of the third hold timer ($T_{ho}$m, third) to be, for example, 1000 milliseconds, and/or the given duration of time of the delta hold timer ($T_{hold,\ delta}$) to be, for example, 640 milliseconds.

In some aspects, the antenna-switching diversity procedure, described herein, may include switching from using the active transmission antenna to using a candidate transmission antenna when (i) an RSRP associated with the candidate transmission antenna is greater than an RSRP associated with the active antenna by at least a threshold amount and (ii) a hold timer associated with the candidate antenna expires within a given duration of time (e.g., a delta hold timer).

By implementing the delta hold timer ($T_{hold,\ delta}$), the UE 120 may switch to the second candidate transmission antenna, to mitigate the antenna degradation observed while using the active transmission antenna to transmit data, without previously switching to the first candidate transmission antenna. In this way, the UE 120 may reduce a number of switching occurrences from one transmission antenna to another. Reducing the number of switching occurrences enables fewer interruptions during the data communication, thereby improving a throughput enabled by the UE 120. Also, by switching to the second candidate transmission antenna, whose RSRP may be greater than the RSRP of the active transmission antenna by a plurality of threshold amounts, the UE 120 may provide an optimized increase in the quality associated with the data communication.

The below pseudocode illustrates an example process relating to example 400. In the below pseudocode, /* and */ delimit code comments. For example, /* ABC */ is a code comment of "ABC." Lines of code are numbered sequentially.

```
1    /* set of all antennas is {A, B, C, D} whereby antenna D is current Tx antenna*/
2    /* antenna_other is one or two antennas from subset {A, B, C} */
3    /* antenna_other and antenna_A are not current Tx antenna */
4    /* antenna_A is first candidate antenna with valid T_hold first to expire */
5    IF T_hold expired for antenna_A /* expired means T_hold timer has expired and we are waiting for next switching occasion*/
6        IF antenna_other T_hold == active /*means T_hold valid or running*/
7            IF ( antenna_other(RSRP) - antenna_A(RSRP) ) > RSRP_Threshold
8                IF T_hold antenna_other =< T_hold_delta /*T_hold_delta is configurable parameter that is stored in UE non-volatile memory, should less than or equal to T_hold */
9                    SET new Tx antenna as antenna_other /* antenna_other is filtered based on T_hold_delta criteria*/
10               ELSE
11                   SET new Tx antenna as antenna_A
12               END
13           END
14       END
15   END
```

In the above pseudocode, $T_{hold}$ for antenna_A may correspond to $T_{hold,\ first}$ of example 400. $T_{hold}$ for antenna_other (which is expressed as "$T_{hold}$ antenna_other" and as "antenna_other $T_{hold}$") may correspond to $T_{hold,\ second}$ of example 400. $T_{hold\_delta}$ may correspond to $T_{hold,\ delta}$ of example 400. RSRP_Threshold may correspond to the second threshold amount of example 400.

As indicated above, FIG. 4 is provided as an example. Other examples may differ from what is described with regard to FIG. 4.

Figure 5:
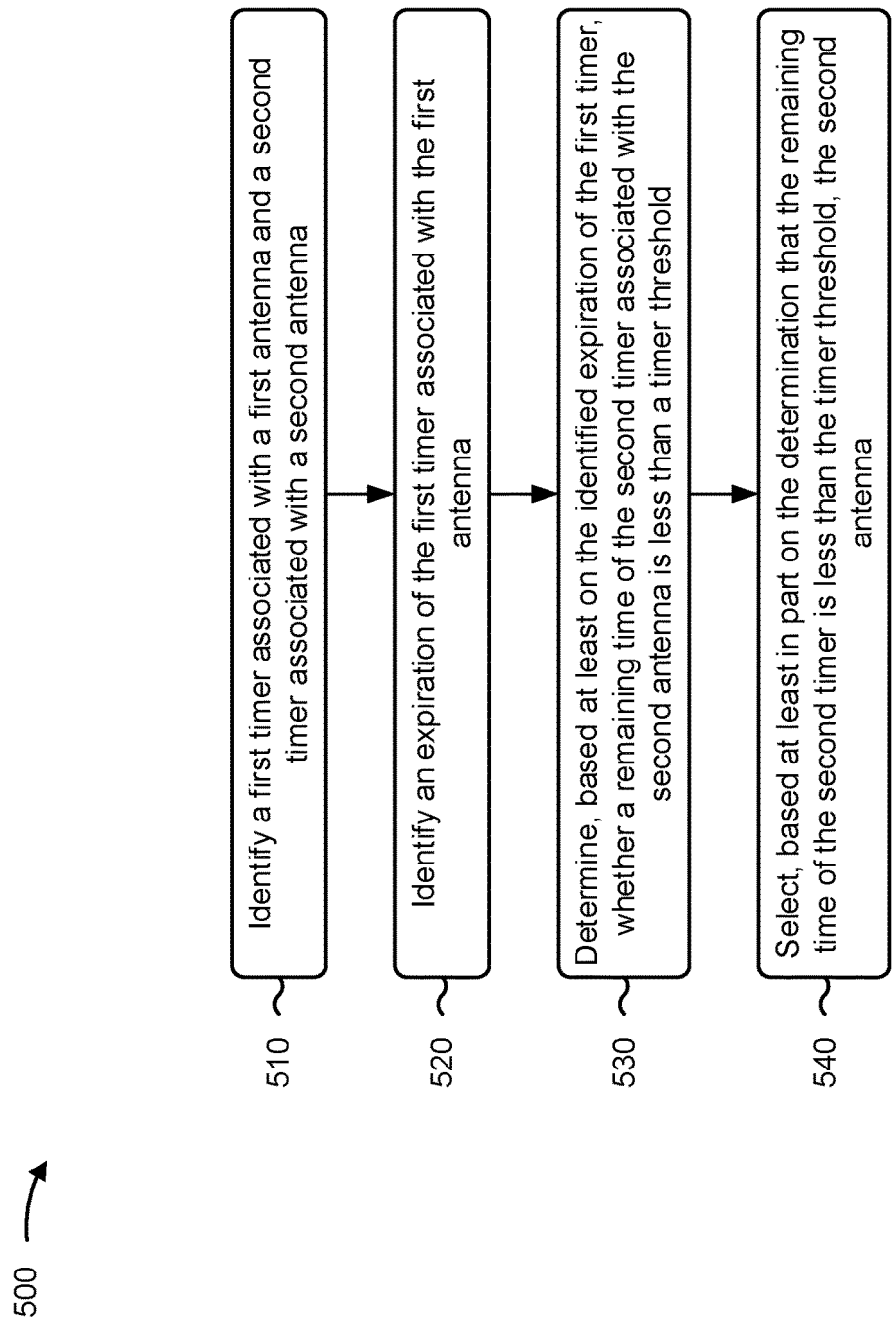
FIG. 5 is a diagram illustrating an example process associated with performing an antenna-switching diversity procedure, in accordance with the present disclosure.

FIG. 5 is a diagram illustrating an example process 500 performed, for example, by a UE, in accordance with the present disclosure. Example process 500 is an example where the UE (e.g., UE 120) performs operations associated with techniques for performing an antenna-switching diversity procedure.

As shown in FIG. 5, in some aspects, process 500 may include identifying a first timer associated with a first antenna and a second timer associated with a second antenna (block 510). For example, the UE (e.g., using identification component 608, depicted in FIG. 6) may identify a first timer associated with a first antenna and a second timer associated with a second antenna, as described above. In some aspects, the first timer is referred to herein as a first hold timer (e.g., $T_{hold,first}$ of FIG. 4) and the second timer is referred to herein as a second hold timer (e.g., $T_{hold,\ second}$ of FIG. 4). The first antenna is referred to herein as a first candidate antenna. The second antenna is referred to herein as a second candidate antenna. In some aspects, the first antenna may include one or more antennas. In some aspects, the second antenna may include one or more antennas.

As further shown in FIG. 5, in some aspects, process 500 may include identifying an expiration of the first timer associated with the first antenna (block 520). For example, the UE (e.g., using identification component 608, depicted in FIG. 6) may identify an expiration of the first timer associated with the first antenna (e.g., at a time $T_S$), as described above. As another example, the UE may determine that the first timer has expired.

As further shown in FIG. 5, in some aspects, process 500 may include determining, based at least in part on the identified expiration of the first timer, whether a remaining time of the second timer associated with the second antenna is less than a timer threshold (block 530). For example, the UE (e.g., using determination component 610, depicted in FIG. 6) may determine, based at least in part on the identified expiration of the first timer, whether a remaining time of the second timer associated with the second antenna is less than a timer threshold, as described above. In some aspects, the timer threshold is associated with a time illustrated in FIG. 4 as $T_A$ based at least in part on a delta hold timer (e.g., $T_{hold,\ delta}$ of FIG. 4). For example, the timer threshold may be determined as a time at which the delta hold timer ends.

As further shown in FIG. 5, in some aspects, process 500 may include selecting, based at least in part on the determination that the remaining time of the second timer is less than the timer threshold, the second antenna (block 540). For example, the UE (e.g., using selection component 612, depicted in FIG. 6) may select, based at least in part on the determination that the remaining time of the second timer is less than the timer threshold, the second antenna, as described above. The UE may use the second antenna as a transmission antenna.

Process 500 may include additional aspects, such as any single aspect or any combination of aspects described below and/or in connection with one or more other processes described elsewhere herein.

In a first aspect, the first timer is identified based at least in part on a first measurement associated with the first antenna satisfying a first criterion with respect to a measurement associated with an active antenna, and the second timer is identified based at least in part on a second measurement associated with the second antenna satisfying a second criterion with respect to the first measurement associated with the first antenna. In some aspects, the first criterion and the second criterion may be based at least in part on threshold amounts, such as the first threshold amount and the second threshold amount described in connection with FIG. 4. For example, the first criterion may be that a difference between the first measurement and the measurement associated with the active antenna is greater than the first threshold amount. For example, the second criterion may be that a difference between the second measurement and the first threshold is greater than the second threshold amount. It should be noted that the first timer can be identified at a different time than the second timer (e.g., separately from one another), as illustrated in FIG. 4.

In a second aspect, alone or in combination with the first aspect, process 500 includes identifying a third timer for a third antenna based at least in part on a third measurement associated with the third antenna satisfying a third criterion with respect to the second measurement associated with the second antenna, wherein the third timer expires after an end of the timer threshold. In some aspects, the third criterion may be based at least in part on a threshold amount, such as the third threshold amount described in connection with FIG. 4. For example, the third criterion may be that a difference between the third measurement and the first measurement (or, in some aspects, the second measurement) is greater than the third threshold amount. The third timer may be $T_{hold,\ third}$. In this example, the UE may filter out the third antenna based at least in part on the third timer expiring after an end of the timer threshold.

In a third aspect, alone or in combination with one or more of the first and second aspects, process 500 includes performing a transmission via the second antenna after selecting the second antenna.

In a fourth aspect, alone or in combination with one or more of the first through third aspects, the timer threshold is adjustable.

In a fifth aspect, alone or in combination with one or more of the first through fourth aspects, a duration associated with the timer threshold (e.g., the given duration of time described with regard to FIG. 4) begins at the expiration of the first timer.

In a sixth aspect, alone or in combination with one or more of the first through fifth aspects, identifying a timer may include starting a hold timer for an antenna. The hold timer is described herein as $T_{hold}$.

In a seventh aspect, alone or in combination with one or more of the first through sixth aspects, starting a hold timer for an antenna may be based at least in part on a determination that a measurement associated with the antenna satisfies a threshold with respect to a measurement associated with another antenna. For example, the threshold may be based at least in part on the first threshold amount, the second threshold amount, or the third threshold amount described herein.

In an eighth aspect, a hold timer for an antenna may expire within a given duration of time (represented by $T_{hold,\ delta}$ in FIG. 4) after an expiration of a hold timer for another antenna, and the antenna may be selected for switching based at least in part on the hold timer for the antenna expiring within the given duration of time.

Although FIG. 5 shows example blocks of process 500, in some aspects, process 500 may include additional blocks, fewer blocks, different blocks, or differently arranged blocks than those depicted in FIG. 5. Additionally, or alternatively, two or more of the blocks of process 500 may be performed in parallel.

Figure 6:
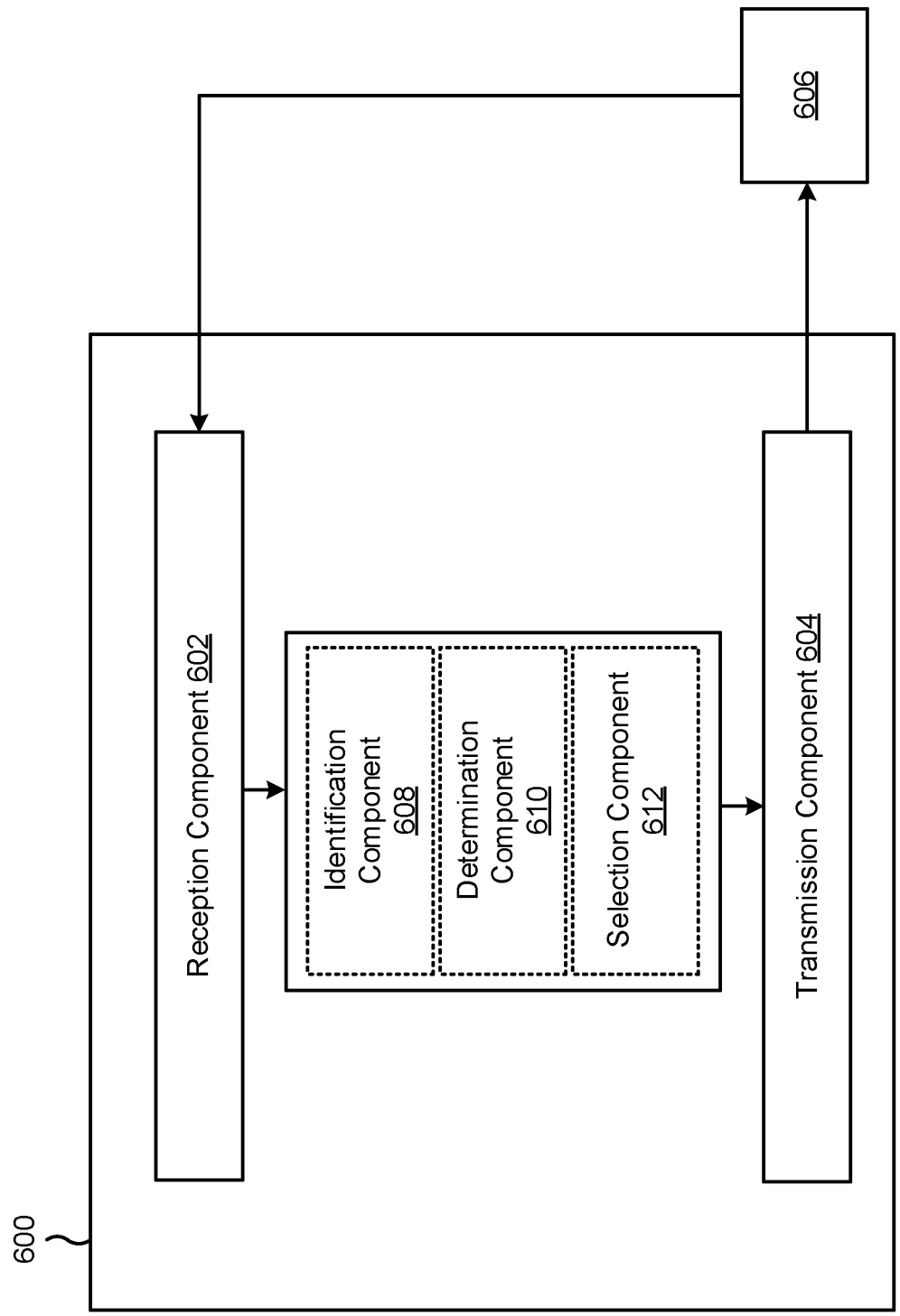
FIGS. 6 and 7 are block diagrams of example apparatuses associated with performing an antenna-switching diversity procedure, in accordance with the present disclosure.

FIG. 6 is a block diagram of an example apparatus 600 for wireless communication. The apparatus 600 may be a UE, or a UE may include the apparatus 600. In some aspects, the apparatus 600 includes a reception component 602 and a transmission component 604, which may be in communication with one another (for example, via one or more buses and/or one or more other components). As shown, the apparatus 600 may communicate with another apparatus 606 (such as a UE, a base station, or another wireless communication device) using the reception component 602 and the transmission component 604. As further shown, the apparatus 600 may include one or more of an identification component 608, a determination component 610, or a selection component 612, among other examples.

In some aspects, the apparatus 600 may be configured to perform one or more operations described herein in connection with FIGS. 4 and 5. Additionally, or alternatively, the apparatus 600 may be configured to perform one or more processes described herein, such as process 500 of FIG. 5. In some aspects, the apparatus 600 and/or one or more components shown in FIG. 6 may include one or more components of the UE described above in connection with FIG. 2. Additionally, or alternatively, one or more components shown in FIG. 6 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 602 may receive communications, such as reference signals, control information, data communications, or a combination thereof, from the apparatus 606. The reception component 602 may provide received communications to one or more other components of the apparatus 600. In some aspects, the reception component 602 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 606. In some aspects, the reception component 602 may include one or more antennas, a demodulator, a MIMO detector, a receive processor, a controller/processor, a memory, or a combination thereof, of the UE described above in connection with FIG. 2.

The transmission component 604 may transmit communications, such as reference signals, control information, data communications, or a combination thereof, to the apparatus 606. In some aspects, one or more other components of the apparatus 606 may generate communications and may provide the generated communications to the transmission component 604 for transmission to the apparatus 606. In some aspects, the transmission component 604 may perform signal processing on the generated communications (such as filtering, amplification, modulation, digital-to-analog conversion, multiplexing, interleaving, mapping, or encoding, among other examples), and may transmit the processed signals to the apparatus 606. In some aspects, the transmission component 604 may include one or more antennas, a modulator, a transmit MIMO processor, a transmit processor, a controller/processor, a memory, or a combination thereof, of the UE described above in connection with FIG. 2. In some aspects, the transmission component 604 may be collocated with the reception component 602 in a transceiver.

The identification component 608 may identify a first timer associated with a first antenna and a second timer associated with a second antenna. In some aspects, the identification component 608 may include one or more antennas, a demodulator, a MIMO detector, a receive processor, a modulator, a transmit MIMO processor, a transmit processor, a controller/processor, a memory, or a combination thereof, of the UE described above in connection with FIG. 2. The identification component 608 may identify an expiration of the first timer associated with the first antenna. In some aspects, the identification component 608 may include one or more antennas, a demodulator, a MIMO detector, a receive processor, a modulator, a transmit MIMO processor, a transmit processor, a controller/processor, a memory, or a combination thereof, of the UE described above in connection with FIG. 2. The determination component 610 may determine, based at least in part on the identified expiration of the first timer, whether a remaining time of the second timer associated with the second antenna is less than a timer threshold. In some aspects, the determination component 610 may include one or more antennas, a demodulator, a MIMO detector, a receive processor, a modulator, a transmit MIMO processor, a transmit processor, a controller/processor, a memory, or a combination thereof, of the UE described above in connection with FIG. 2. The selection component 612 may select, based at least in part on the determination that the remaining time of the second timer is less than the timer threshold, the second antenna. In some aspects, the selection component 612 may include one or more antennas, a demodulator, a MIMO detector, a receive processor, a modulator, a transmit MIMO processor, a transmit processor, a controller/processor, a memory, or a combination thereof, of the UE described above in connection with FIG. 2.

The identification component 608 may identify a third timer for a third antenna based at least in part on a third measurement associated with the third antenna satisfying a third criterion with respect to the second measurement associated with the second antenna, wherein the third timer expires after an end of the timer threshold. In some aspects, the identification component 608 may include one or more antennas, a demodulator, a MIMO detector, a receive processor, a modulator, a transmit MIMO processor, a transmit processor, a controller/processor, a memory, or a combination thereof, of the UE described above in connection with FIG. 2.

The transmission component 604 may perform a transmission via the second antenna after selecting the second antenna. In some aspects, the transmission component 604 may include one or more antennas, a demodulator, a MIMO detector, a receive processor, a modulator, a transmit MIMO processor, a transmit processor, a controller/processor, a memory, or a combination thereof, of the UE described above in connection with FIG. 2.

The number and arrangement of components shown in FIG. 6 are provided as an example. In practice, there may be additional components, fewer components, different components, or differently arranged components than those shown in FIG. 6. Furthermore, two or more components shown in FIG. 6 may be implemented within a single component, or a single component shown in FIG. 6 may be implemented as multiple, distributed components. Additionally, or alternatively, a set of (one or more) components shown in FIG. 6 may perform one or more functions described as being performed by another set of components shown in FIG. 6.

Figure 7:
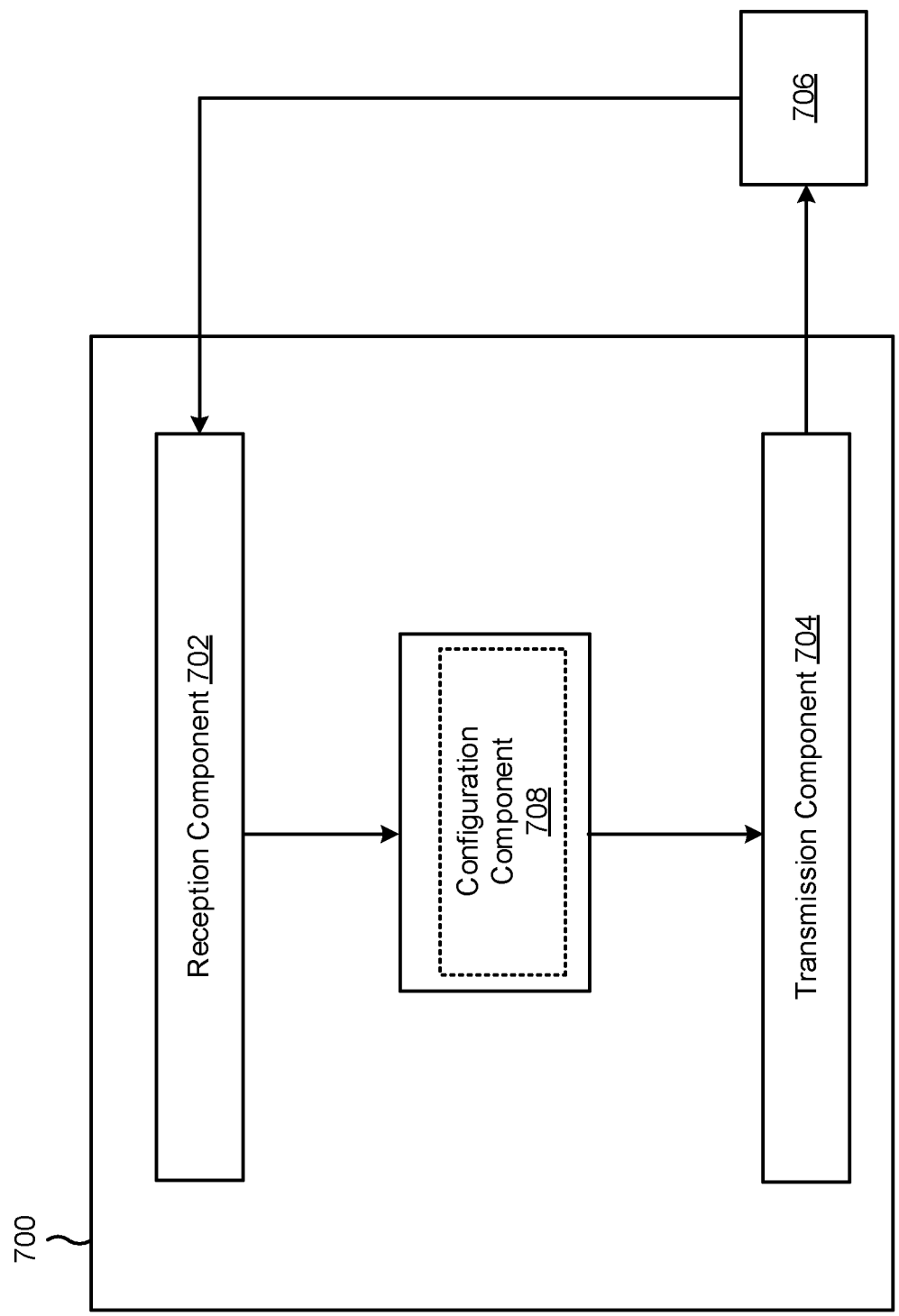

FIG. 7 is a block diagram of an example apparatus 700 for wireless communication. The apparatus 700 may be a transmitter, or a transmitter may include the apparatus 700. In some aspects, the apparatus 700 includes a reception component 702 and a transmission component 704, which may be in communication with one another (for example, via one or more buses and/or one or more other components). As shown, the apparatus 700 may communicate with another apparatus 706 (such as a UE, a base station, or another wireless communication device) using the reception component 702 and the transmission component 704. As further shown, the apparatus 700 may include one or more of a configuration component 708, among other examples.

In some aspects, the apparatus 700 may be configured to perform one or more operations described herein in connection with FIGS. 4 and 5. Additionally, or alternatively, the apparatus 700 may be configured to perform one or more processes described herein. In some aspects, the apparatus 700 and/or one or more components shown in FIG. 7 may include one or more components of the transmitter described above in connection with FIG. 2. Additionally, or alternatively, one or more components shown in FIG. 7 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 702 may receive communications, such as reference signals, control information, data communications, or a combination thereof, from the apparatus 706. The reception component 702 may provide received communications to one or more other components of the apparatus 700. In some aspects, the reception component 702 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 706. In some aspects, the reception component 702 may include one or more antennas, a demodulator, a MIMO detector, a receive processor, a controller/processor, a memory, or a combination thereof, of the transmitter described above in connection with FIG. 2.

The transmission component 704 may transmit communications, such as reference signals, control information, data communications, or a combination thereof, to the apparatus 706. In some aspects, one or more other components of the apparatus 706 may generate communications and may provide the generated communications to the transmission component 704 for transmission to the apparatus 706. In some aspects, the transmission component 704 may perform signal processing on the generated communications (such as filtering, amplification, modulation, digital-to-analog conversion, multiplexing, interleaving, mapping, or encoding, among other examples), and may transmit the processed signals to the apparatus 706. In some aspects, the transmission component 704 may include one or more antennas, a modulator, a transmit MIMO processor, a transmit processor, a controller/processor, a memory, or a combination thereof, of the transmitter described above in connection with FIG. 2. In some aspects, the transmission component 704 may be collocated with the reception component 702 in a transceiver.

In some aspects, the reception component 702 may receive, among other things, information regarding (i) a timer identified by, for example, the identification component, depicted in FIG. 6, (ii) a timer threshold determined by, for example, the determination component 610, depicted in FIG. 6, and/or (iii) an antenna selected by, for example, the selection component 612, depicted in FIG. 6. The configuration component 708 may enable processing of the received information and enable generation and/or provision of configuration information. The transmission component 704 may transmit the configuration information to, for example, the apparatus 706 and/or the reception component 602, depicted in FIG. 6.

The number and arrangement of components shown in FIG. 7 are provided as an example. In practice, there may be additional components, fewer components, different components, or differently arranged components than those shown in FIG. 7. Furthermore, two or more components shown in FIG. 7 may be implemented within a single component, or a single component shown in FIG. 7 may be implemented as multiple, distributed components. Additionally, or alternatively, a set of (one or more) components shown in FIG. 7 may perform one or more functions described as being performed by another set of components shown in FIG. 7.

The following provides an overview of some Aspects of the present disclosure:

Aspect 1: A method of wireless communication performed by a user equipment (UE), comprising: identifying a first timer associated with a first antenna and a second timer associated with a second antenna; identifying an expiration of the first timer associated with the first antenna; determining, based at least in part on the identified expiration of the first timer, whether a remaining time of the second timer associated with the second antenna is less than a timer threshold; and selecting, based at least in part on the determination that the remaining time of the second timer is less than the timer threshold, the second antenna.

Aspect 2: The method of Aspect 1, wherein the first timer is identified based at least in part on a first measurement associated with the first antenna satisfying a first criterion with respect to a measurement associated with an active antenna, and the second timer is identified based at least in part on a second measurement associated with the second antenna satisfying a second criterion with respect to the first measurement associated with the first antenna.

Aspect 3: The method of Aspect 2, further comprising: identifying a third timer for a third antenna based at least in part on a third measurement associated with the third antenna satisfying a third criterion with respect to the second measurement associated with the second antenna, wherein the third timer expires after an end of the timer threshold.

Aspect 4: The method of Aspect 3, wherein the third antenna is identified prior to selecting the second antenna.

Aspect 5: The method of any of Aspects 1-4, wherein selecting the second antenna further comprises: performing a transmission via the second antenna.

Aspect 6: The method of any of Aspects 1-5, wherein the timer threshold is adjustable.

Aspect 7: The method of any of Aspects 1-6, wherein a duration associated with the timer threshold begins at the expiration of the first timer.

Aspect 8: The method of any of Aspects 1-7, wherein the first timer is identified separately from the second timer.

Aspect 9: An apparatus for wireless communication at a device, comprising a processor; memory coupled with the processor; and instructions stored in the memory and executable by the processor to cause the apparatus to perform the method of one or more of Aspects 1-8.

Aspect 10: A device for wireless communication, comprising a memory and one or more processors coupled to the memory, the one or more processors configured to perform the method of one or more of Aspects 1-8.

Aspect 11: An apparatus for wireless communication, comprising at least one means for performing the method of one or more of Aspects 1-8.

Aspect 12: A non-transitory computer-readable medium storing code for wireless communication, the code comprising instructions executable by a processor to perform the method of one or more of Aspects 1-8.

Aspect 13: A non-transitory computer-readable medium storing a set of instructions for wireless communication, the set of instructions comprising one or more instructions that, when executed by one or more processors of a device, cause the device to perform the method of one or more of Aspects 1-8.

The foregoing disclosure provides illustration and description, but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware, firmware, and/or a combination of hardware and software. As used herein, a processor is implemented in hardware, firmware, and/or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method of wireless communication performed by a user equipment (UE), comprising:
   identifying a first timer associated with a first antenna and a second timer associated with a second antenna;
   identifying an expiration of the first timer associated with the first antenna;
   determining, based at least in part on the identified expiration of the first timer, whether a remaining time of the second timer associated with the second antenna is less than a timer threshold; and
   selecting, based at least in part on the determination that the remaining time of the second timer is less than the timer threshold, the second antenna.

2. The method of claim 1, wherein the first timer is identified based at least in part on a first measurement associated with the first antenna satisfying a first criterion with respect to a measurement associated with an active antenna, and the second timer is identified based at least in part on a second measurement associated with the second antenna satisfying a second criterion with respect to the first measurement associated with the first antenna.

3. The method of claim 2, further comprising:
   identifying a third timer for a third antenna based at least in part on a third measurement associated with the third antenna satisfying a third criterion with respect to the second measurement associated with the second antenna, wherein the third timer expires after an end of the timer threshold.

4. The method of claim 3, wherein the third antenna is identified prior to selecting the second antenna.

5. The method of claim 1, wherein selecting the second antenna further comprises:
   performing a transmission via the second antenna.

6. The method of claim 1, wherein the timer threshold is adjustable.

7. The method of claim 1, wherein a duration associated with the timer threshold begins at the expiration of the first timer.

8. The method of claim 1, wherein the first timer is identified separately from the second timer.

9. A user equipment (UE) for wireless communication, comprising:
   a memory; and
   one or more processors, coupled to the memory, configured to:
   identify a first timer associated with a first antenna and a second timer associated with a second antenna;
   identify an expiration of the first timer associated with the first antenna;
   determine, based at least in part on the identified expiration of the first timer, whether a remaining time of the second timer associated with the second antenna is less than a timer threshold; and
   select, based at least in part on the determination that the remaining time of the second timer is less than the timer threshold, the second antenna.

10. The UE of claim 9, wherein the first timer is identified based at least in part on a first measurement associated with the first antenna satisfying a first criterion with respect to a measurement associated with an active antenna, and the second timer is identified based at least in part on a second measurement associated with the second antenna satisfying a second criterion with respect to the first measurement associated with the first antenna.

11. The UE of claim 10, wherein the one or more processors are further configured to:
   identify a third timer for a third antenna based at least in part on a third measurement associated with the third antenna satisfying a third criterion with respect to the second measurement associated with the second antenna, wherein the third timer expires after an end of the timer threshold.

12. The UE of claim 11, wherein the one or more processors, when identifying the third antenna, are configured to identify the third antenna prior to selecting the second antenna.

13. The UE of claim 9, wherein the one or more processors, when selecting the second antenna, are further configured to:
   perform a transmission via the second antenna.

14. The UE of claim 9, wherein the timer threshold is adjustable.

15. The UE of claim 9, wherein a duration associated with the timer threshold begins at the expiration of the first timer.

16. The UE of claim 9, wherein the first timer is identified separately from the second timer.

17. A non-transitory computer-readable medium storing a set of instructions for wireless communication, the set of instructions comprising:
   one or more instructions that, when executed by one or more processors of a user equipment (UE), cause the UE to:
   identify a first timer associated with a first antenna and a second timer associated with a second antenna;
   identify an expiration of the first timer associated with the first antenna;
   determine, based at least in part on the identified expiration of the first timer, whether a remaining time of the second timer associated with the second antenna is less than a timer threshold; and
   select, based at least in part on the determination that the remaining time of the second timer is less than the timer threshold, the second antenna.

18. The non-transitory computer-readable medium of claim 17, wherein the first timer is identified based at least in part on a first measurement associated with the first antenna satisfying a first criterion with respect to a measurement associated with an active antenna, and the second timer is identified based at least in part on a second measurement associated with the second antenna satisfying a second criterion with respect to the first measurement associated with the first antenna.

19. The non-transitory computer-readable medium of claim 18, wherein the one or more instructions further cause the UE to:
   identify a third timer for a third antenna based at least in part on a third measurement associated with the third antenna satisfying a third criterion with respect to the second measurement associated with the second antenna, wherein the third timer expires after an end of the timer threshold.

20. The non-transitory computer-readable medium of claim 19, wherein the one or more instructions, that cause the UE to identify the third antenna, further cause the UE to identify the third antenna prior to selecting the second antenna.

21. The non-transitory computer-readable medium of claim 17, wherein the one or more instructions further cause the UE to:
perform a transmission via the second antenna after selecting the second antenna.

22. The non-transitory computer-readable medium of claim 17, wherein the timer threshold is adjustable.

23. The non-transitory computer-readable medium of claim 17, wherein a duration associated with the timer threshold begins at the expiration of the first timer.

24. An apparatus for wireless communication, comprising:
means for identifying a first timer associated with a first antenna and a second timer associated with a second antenna;
means for identifying an expiration of the first timer associated with the first antenna;
means for determining, based at least in part on the identified expiration of the first timer, whether a remaining time of the second timer associated with the second antenna is less than a timer threshold; and
means for selecting, based at least in part on the determination that the remaining time of the second timer is less than the timer threshold, the second antenna.

25. The apparatus of claim 24, wherein the first timer is identified based at least in part on a first measurement associated with the first antenna satisfying a first criterion with respect to a measurement associated with an active antenna, and the second timer is identified based at least in part on a second measurement associated with the second antenna satisfying a second criterion with respect to the first measurement associated with the first antenna.

26. The apparatus of claim 25, further comprising:
means for identifying a third timer for a third antenna based at least in part on a third measurement associated with the third antenna satisfying a third criterion with respect to the second measurement associated with the second antenna, wherein the third timer expires after an end of the timer threshold.

27. The apparatus of claim 26, wherein the means for identifying the third antenna further comprises means for identifying the third antenna prior to selecting the second antenna.

28. The apparatus of claim 24, wherein the means for selecting the second antenna further comprises:
means for performing a transmission via the second antenna.

29. The apparatus of claim 24, wherein the timer threshold is adjustable.

30. The apparatus of claim 24, wherein a duration associated with the timer threshold begins at the expiration of the first timer.

* * * * *